United States Patent [19]

Riolfo et al.

[11] Patent Number: 4,660,078

[45] Date of Patent: Apr. 21, 1987

[54] CODER-DECODER FOR TRANSMISSION AND/OR RECEPTION OF TELEVISION PICTURES VIA DIGITAL LOW-SPEED CHANNEL

[75] Inventors: Benedetto Riolfo, Turin; Mario Guglielmo, Montalenghe; Giovanni Baronetti, Turin, all of Italy

[73] Assignee: Sip-Societa Italiana per l'Esercizio Telefonico S.p.A., Turin, Italy

[21] Appl. No.: 652,770

[22] Filed: Sep. 20, 1984

[30] Foreign Application Priority Data

Sep. 29, 1983 [IT] Italy .................. 68002 A/83

[51] Int. Cl.[4] ........................................... H04N 7/133
[52] U.S. Cl. ................................. 358/133; 358/135
[58] Field of Search .................. 358/133, 134, 135

[56] References Cited

U.S. PATENT DOCUMENTS

| | | | |
|---|---|---|---|
| 4,125,873 | 11/1978 | Chesarek | 358/133 |
| 4,196,448 | 4/1980 | Whitehouse | 358/135 |
| 4,375,650 | 3/1983 | Tiemann | 358/133 |
| 4,386,366 | 5/1983 | Mori | 358/135 |

Primary Examiner—Howard W. Britton
Attorney, Agent, or Firm—Karl F. Ross; Herbert Dubno

[57] ABSTRACT

Coder-decoder of television pictures for transmission and/or reception via digital low-speed channel. In transmission, it first carries out the bidimensional transform of digital sample blocks of the television signal and then a dichotomic quantization thus obtaining quantized coefficients with variable length as a function of the coefficient index; in reception, it first carries out a quantization for quantized coefficients re-assignment of suitable quantization levels, and then the bidimensional antitransform for obtaining again the digital television signal samples. An optimized configuration of digital sample memory in transmission and in reception is shown in FIG. 1.

10 Claims, 11 Drawing Figures

CODER-DECODER FOR TRANSMISSION AND/OR RECEPTION OF TELEVISION PICTURES VIA DIGITAL LOW-SPEED CHANNEL

DESCRIPTION OF THE INVENTION

This invention relates to processing systems of image signal, and in particular to a coder-decoder for transmission and/or reception of television pictures via digital low-speed channel.

Major barrier to the study and implementation of devices for image transmission and reception via low-speed channel, includes transmission speed which limits motion picture representation and image quality.

Some of these devices are defined as "Still picture transmission systems", i.e. systems for transmission and reception of still pictures, sampled at regular intervals according to picture quality expected. These systems for a low-speed transmission channel (upper limit = 128 kbit/s) carry out a high band-compression of TV signal and the consequent visual effect is a picture updating at time intervals depending on the picture quality expected, and a lower picture definition.

Various implementations presenting different band compression methods are known. Some systems compress the analogic signal by means of a low-pass filtering possibly using the same physical support which carries the information; other systems use a lower resolution, for example, through a reduction of the line number with respect to typical TV standard.

A third type of systems works on digital TV signal: some carry out a simple sub-sampling, generally in the horizontal and vertical directions, preceded by a suitable filtering; other more sophisticated systems use redundancy reduction algorithms; the implementation techniques used to-date consist in differential coding, possibly even adaptive coding.

The above systems limit too much quality, resolution and minimum updating time to achieve economy and simplicity: most of the sophisticated systems use picture updating times never lower than 4 s in order to keep picture quality within the limits established by the CCIR standards under study for this kind of transmission.

These problems are solved by this invention of a coder-decoder for transmission and/or reception of television pictures via digital low-speed channel, which reduces the minimum updating time to about 1 s keeping picture quality within the previously established o limits, or conversely, by keeping an equal updating time with respect to the systems known, it allows an improved definition quality (about 1 to 4 ratio).

The system carries out the bidirectional transmission of television frames or fields in succession so as to give rise to almost a motion effect; it uses a redundancy reduction algorithm based on the bidirectional orthogonal transform and subsequent quantization of blocks constituting picture frames.

The particular object of the present invention is a coder-decoder of television pictures as described in claim 1.

Characteristics of the invention will be further clarified by the following description of a preferred embodiment thereof given by way of example only, and by the accompanying drawing, in which.

Figure 1:
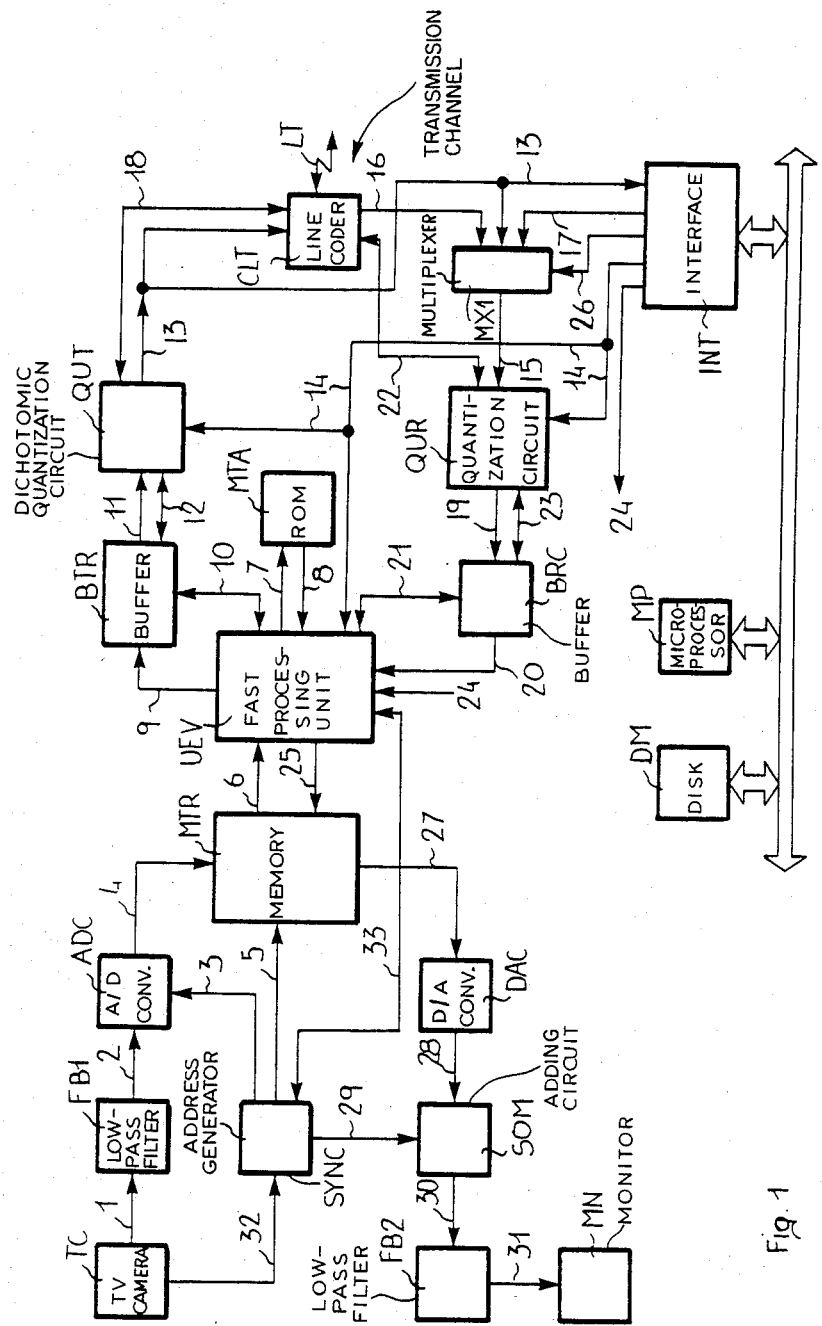
FIG. 1 is a block diagram of the device object of the present invention.

In FIG. 1, TC is a typical black and white television camera, which sends through wire 1 the analogic television signal to a typical low-pass filter FB1 having a cut-off frequency of 5 MHz. FB1 sends through wire 2 the filtered analogic television signal to ADC which consists of a typical analog-to-digital converter. Its sampling frequency $f_c$ is an integer multiple of the line frequency and is given by:

$$f_c = 12/5 \ (f_{sc} - 25) \simeq 10,64.10^6 \text{ Hz}$$

where $f_{sc} \simeq 4,43$ MHz is the frequency of the chrominance sub-carrier of the television signal. Then, 681 bytes of digital samples for each television signal line are obtained. The signal having frequency $f_c$ is sent to ADC through wire 3 from block SYNC, explained later. ADC sends through wire 4 the digital samples obtained to memory MTR of transmission and reception digital samples, hereinafter called video memory, which receives control signals and addresses through bus 5 from block SYNC.

As explained after, the samples of one frame or field every n are sequentially written in video memory MTR; the other frames or fields are neglected.

The samples written previously into MTR are then read in suitable instants; reading is no more sequential, in fact blocks of 16×16 samples corresponding to bidimensional picture portions are read.

Samples are read block by block and transferred through bus 6 to a work memory, of capacity equal to one block, present in a fast processing unit UEV, described in connection with FIG. 5.

UEV calculates the bidimensional transform of picture block using the transform bases stored in a transform and antitransform read-only memory MTA.

MTA receives commands and addresses from UEV through bus 7 and sends data through bus 8.

UEV, through bus 9, emits the transformed coefficients of a block of samples, then temporarily stored in transmission buffer BTR, of capacity equal to 1 block, which fits the rate of data flow coming from UEV with that of transmission channel LT. Through connection 10, BTR and UEV exchange control signals, for example the information of "full buffer" which temporarily stops the sending of the transformed coefficients from UEV to BTR; these signals are detailed in connection with FIG. 5.

The transformed coefficients are then quantized in block QUT consisting of a dichotomic quantization circuit, connected to BTR through bus 11.

For quantization, QUT uses quantization parameters supplied by microprocessor MP, through interface INT and bus 14 in the initialization phase and stored in the internal memories. These parameters can be successively modified. QUT exchanges suitable control signals with blocks BTR and CLT through connections 12 and 18.

Block QUT will be detailed in connection with FIG. 8. The quantized coefficients emitted by QUT through bus 13 can be sent to:

channel LT, through line coder CLT, for transmission to the receiving part of a device similar to that of FIG. 1, placed at the opposite end of LT; coder CL, using a known transmission protocol, organizes data on 64 kbit/s digital line LT in suitable length frames and carries out all known line signalling functions;

an input of multiplexer MX1 belonging to the same receiving part, for example, for laboratory tests with new quantization parameters or new transform bases;

microprocessor MP, through interface INT, for storage in a picture store, consisting for example of a magnetic disk DM, and/or for coefficient statistics evaluation and consequent possible modification and adaptation of quantization parameters or the kind of picture to be transmitted: in the last case, microprocessor can update quantization parameters (quantization levels and bit assignment for each coefficient) substituting the parameters written previously in internal memories of QUT and QUR.

The circuit blocks just described constitute the transmitting part of the device.

Receiving part inputs, i.e. multiplexer MX1 inputs, receive quantized coefficients, related to a picture signal, which can come from:

channel LT, through coder CLT and bus 16, transmitted by the transmitting part of the other device placed at the opposite end of LT;

the transmitting part, through bus 13, as already described;

picture store DM, through interface INT and bus 17.

Microprocessor MP, through INT and selection signal 26, connects an input of MX1, through bus 15, to quantization circuit QUR of the receiving part which reassigns original word lenght to each coefficient using the quantization parameters written, during initialization, by microprocessor MP through bus 14 into its internal memories.

QUR output, connected to bus 19, presents the reconstructed coefficients of the bidimensional transform similar to those present on bus 11.

QUR exchanges with blocks CLT and BRC suitable control signals through connections 22 and 23, as detailed in connection with FIG. 9.

The coefficients of bus 19 are then sent to receiving buffer BRC (similar to BTR) which on turn writes them, through bus 20, in another work memory, of a capacity equal to one block, present in UEV.

BRC, through connection 21, exchanges with UEV suitable control signals, such as "empty buffer" information, which interrupts coefficient acquisition from BRC.

UEV calculates the bidimensional antitransform of the coefficients received from BRC, using the antitransform bases stored in MTA and obtains digital block-organized video-signal samples.

UEV receives from microprocessor MP, through INT and bus 24, suitable parameters, described later, during initialization.

The digital samples obtained by UEV are written block by block in video memory MTR through bus 25. Then, the samples are sequentially read from memory MTR and sent through bus 27 to block DAC consisting of a digital-analog converter, whose output connected to wire 28 presents the analogic picture signal. In adder circuit SOM, picture signal is added to video synchronism signals sent from block SYNC through wire 29.

The reconstructed analogic video signal is still filtered in FB2 (similar to FB1), connected to SOM through wire 30 and sent through wire 31 to monitor MN for visualization.

Block SYNC picks-up from television camera TC the analogic video synchronism signal, used as a reference for generating the following signals at its outputs: frequency $f_c$ signal on wire 3, video synchronism signal on wire 29, control and address signals for MTR on bus 5, and addresses and control signals for UEV on bus 33.

Figure 2:
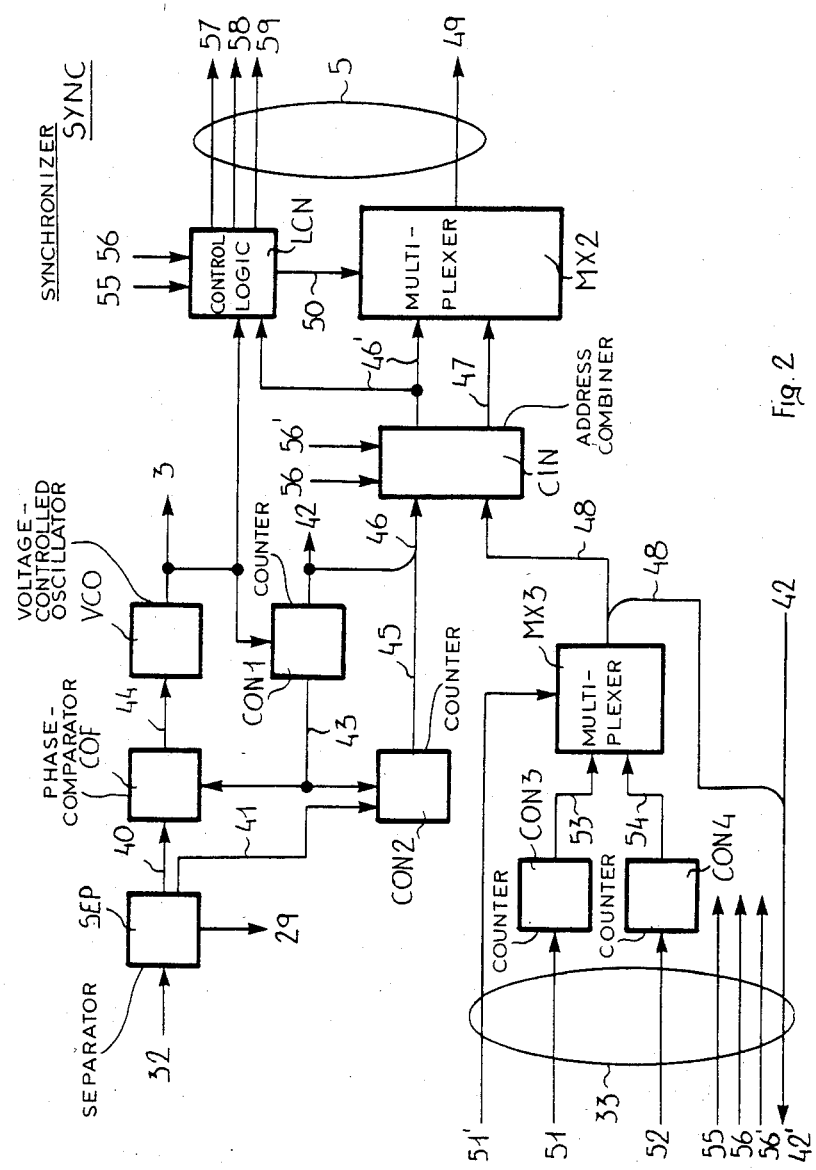
FIG. 2 is the diagram of block SYNC of FIG. 1.

In FIG. 2, SEP is a typical circuit which separates video synchronism signals from video signal received from television camera TC (FIG. 1) via wire 32. SEP emits again via wire 29 the video synchronism signal to block SOM (FIG. 1); furthermore, it emits via wire 40 the line synchronism signal and via wire 41 the frame synchronism.

Blocks COF, VCO, CON1 constitute typical phase locked loop circuit (PLL circuit) which generates a frequency locked to signal phase on wire 40. In particular, VCO is a voltage-controlled oscillator which generates on wire 3, the sampling frequency signal $f_c$, supplied also to blocks CON1 and LCN. Block CON1 consists of a typical counter of successive points of a picture line, which sends via bus 42 the binary coding of the counting carried out and is reset to zero when the binary value 681 is reached. Bus 42 consists of nine wires corresponding to the nine least significant bits identifying $29 = 512$ points out of 681 points of each line, while the most significant bit is not available for output. CON1 emits via wire 43 a line frequency signal, obtained dividing by 681 the signal on wire 3; the signal on wire 43 is then phase-compared, in phase-comparator COF, with the signal on wire 40; COF emits on wire 44 the control signal for VCO.

The signal on wire 43 is also sent to block CON2 consisting of a binary counter of picture frame lines reset to zero with a frequency equal to that of frame synchronism signal received via wire 41.

The nine least significant bits of the binary number counted identify the sequential line-address and are emitted on bus 45, while the most significant tenth bit is not available as output.

The wires of buses 42 and 45 constitute also the wires of the least and most significant positions of bus 46 connected to an input of block CIN consisting of an address combiner whose second input is connected to bus 48. Block CIN receives signals 56 and 56' and will be further discussed below in connection with FIG. 10. A first output of CIN connected to bus 46' presents the addresses necessary for sequential reading and writing of video memory MTR of FIG. 1; these sequential operations are carried out on data coming from ADC via bus 4 and data sent to DAC via bus 27. Bus 46' is connected to an input of multiplexer MX2.

A second output of CIN connected to bus 47 (FIG. 2) presents the addresses for block-by-block writing and reading of memory MTR of FIG. 1; these operations concern data reaching MTR via bus 25 and data sent to UEV via bus 6.

Bux 47 (FIG. 2) is connected to the second input of multiplexer MX2. The addressing choice, i.e. the bus (46' or 47) to be connected to the output of MX2 via bus 49, depends on control logic LCN, further discussed below, which sends to MX2 the control signal via wire 50.

A double pulse is sent via wire 51 wherever a picture sample block is to be transferred from MTR (FIG. 1) to UEV via bus 6.

Wire 51 (FIG. 2) is connected to the input of a typical counter CON3 which supplies via bus 53 the binary coding of the number counted which represents the number of the semiblock of samples read in MTR.

As the number of picture blocks is equal to a power of two, CON3 reaches the maximum counting value in correspondence with the last block of each picture, then is automatically reset to zero in correspondence of the first block of next picture.

A double pulse comes via wire 52 whenever a picture sample block is to be transferred from UEV (FIG. 1) to MTR via bus 25.

Wire 52 (FIG. 2) is connected to the input of a counter CON4, equal to CON3, which supplies via bus 54 the binary coding of the number counted which represents the number of the semiblock of samples written in MTR.

MX3 is a multiplexer which connects bus 53 or 54 to bus 48 according to the logic signal value supplied to the control input via wire 51.

The signal on wire 51' establishes the switching, during block addressing, of received and transmitted block.

Wire 48' of the least significant position of bus 48 (which then identifies the two semiblocks of a block) is also the wire of the most significant position of bus 42', whose least significant positions consist of the seven least significant positions of bus 42. Via bus 33, wires 55 and 56, coming from UEV, reach block LCN. Via wire 55, UEV sends a pulse when all operations related to a picture block are finished, and a pulse via wire 56 when all operations related to a frame or a field are finished (depending on half or full duplex operation).

Logic LCN supplies suitable control signals to memory MTR (FIG. 1) via wires 57, 58, 59 which constitute, together with bus 49, bus 5 (FIG. 1).

Bus 42' and wires 51, 51', 52, 55, 56, 56' constitute bus 33 connected to block UEV (FIG. 1).

Figure 3A:
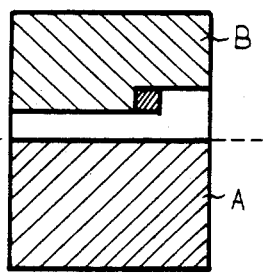
FIGS. 3a, 3b show use diagrams of memory MTR of FIG. 1.
Figure 3B:
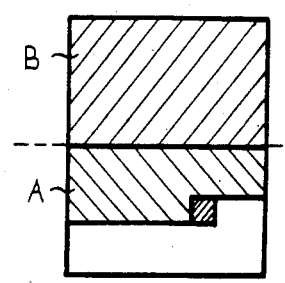
Figure 4:
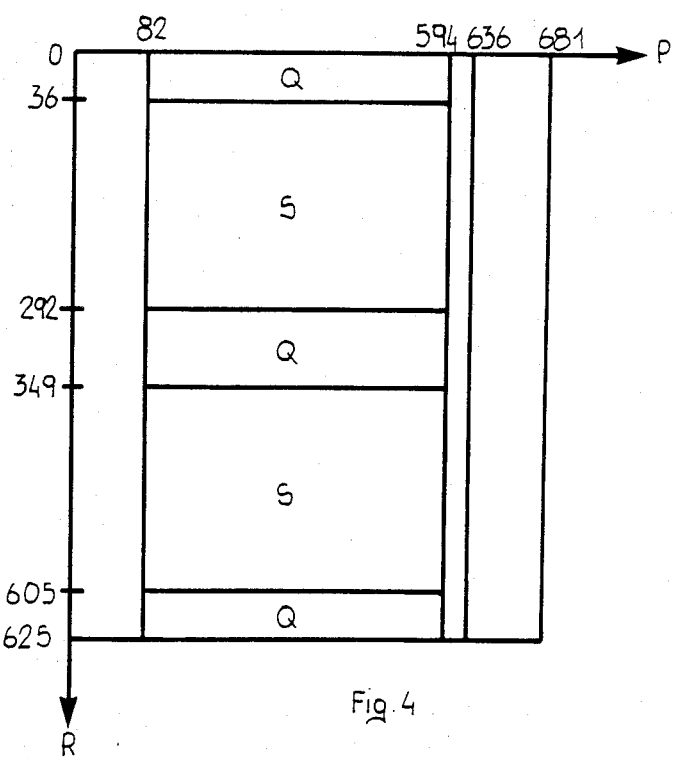
FIG. 4 shows a diagram related to the addressing of memory MTR.

Referring to FIGS. 3a, 3b, 4 we describe the address generation criteria for reading and writing of video memory MTR of FIG. 1; according to this description, any skilled in the art can implement control logic LCN of FIG. 2.

FIGS. 3a and 3b show the use diagram of memory MTR of FIG. 1, which is divided into two parts (A and B) for full duplex operation. Under steady state conditions and at a given instant, a field coming from television camera TC (FIG. 1) and converted into digital samples by ADC is sequentially written in part B of MTR.

Then, part B is read block-by-block: each block read is transferred to UEV via bus 6 and immediately substituted by a sample block, of corresponding positions, coming from UEV via bus 25.

During this phase, part A contains the digital samples, of a television field, transferred previously, block-by-block, to MTR via bus 25; part A is sequentially and cyclically read and the samples read are transferred via bus 27 to converter DAC for the composition of the video signal to be visualized on monitor MN; the sequential and cyclic reading corresponds to a visualization of the same picture field for a given time.

Part A is sequentially and cyclically read up to the end of all block reading and writing operations of pats.

B. Now B presents the next picture for monitor MN; from this instant on (FIG. 3b), part B is sequentially and cyclically read, while in part A, the samples of another television field, coming at that moment from television camera TC, are first written and then read and substituted using the block reading and writing procedure described for part B.

Then, part A and part B continuously alternate. Conversely, a half-duplex operation requires a full-resolution picture representation, that is the use of two different picture fields and the whole video memory MTR either in transmission or in reception; then, previous alternation is no more required, but sequential acquisition and block reading (device used only as transmitter), or block writing and sequential visualization (device used only as receiver) are carried out using the whole memory at successive time intervals.

In half-duplex, still pictures are transmitted for a given time established by the user and, if the device is used as receiver, visualisation can or cannot be disabled during block-by-block writing, as next picture would appear as a block-by-block overlapping to previous picture.

FIG. 4 shows a diagram, where abscissae indicate points P corresponding to the succession of 681 digital samples of a picture line and ordinates indicate lines R corresponding to a full frame of picture signal (625 lines according to European standard CCIR-625). This diagram shows the time subdivision between block-by-block and sequential addressing of video memory MTR of FIG. 1, taking as a reference a time interval corresponding to the full scanning of a television frame, consisting of two interlaced fields, by both TC and MN (FIG. 1).

The television screen visualizes only the central part of the frame, because picture edges correspond to field and line return intervals. This implementation visualizes a picture corresponding to samples 83 to 594 of each line and lines 37 to 292 of the first field and lines 350 to 605 of the second field (i.e. 512 samples for 512 lines).

The intervals corresponding to acquisition from TC and to real picture visualisation by MN are used for sequential reading or writing in MTR: these intervals correspond to areas S (FIG. 4). Conversely, all line return intervals, beginning from sample 636 of a line and ending at sample 82 of next line, are used for block-by-block reading and writing in MTR; these intervals correspond to areas N (FIG. 4).

As will be further discussed, the samples of a semi-block can be transferred at each line return.

During the time intervals which in FIG. 4 correspond to areas Q (samples 83 to 594; lines 0 to 36, 293 to 349, 606 to 625) dynamic video memory MTR is refreshed. Finally, during time intervals which in FIG. 4 correspond to area D (samples 595 to 635 of all lines), memory MTR is disabled.

Then, memory MTR is addressed respecting both time subdivision between block-by-block and sequential access of FIG. 4, and in the case of full-duplex operation, space division (FIGS. 3a, 3b) in the two parts A and B which alternate.

The size of memory MTR, which is very expensive, is so minimized. Returning to FIG. 2, logic LCN emits via wire 50 the signal which controls addressing (sequential or block-by-block) with time switching according to diagram of FIG. 4.

Furthermore, LCN sends: via wire 57, the reading/writing signal; via wire 58, the enabling signal for refreshing, during intervals Q of FIG. 4; via wire 59, the disabling signal in the time intervals corresponding to area D of FIG. 4. Bus 49 and wires 57, 58, 59 form bus 5.

Figure 5:
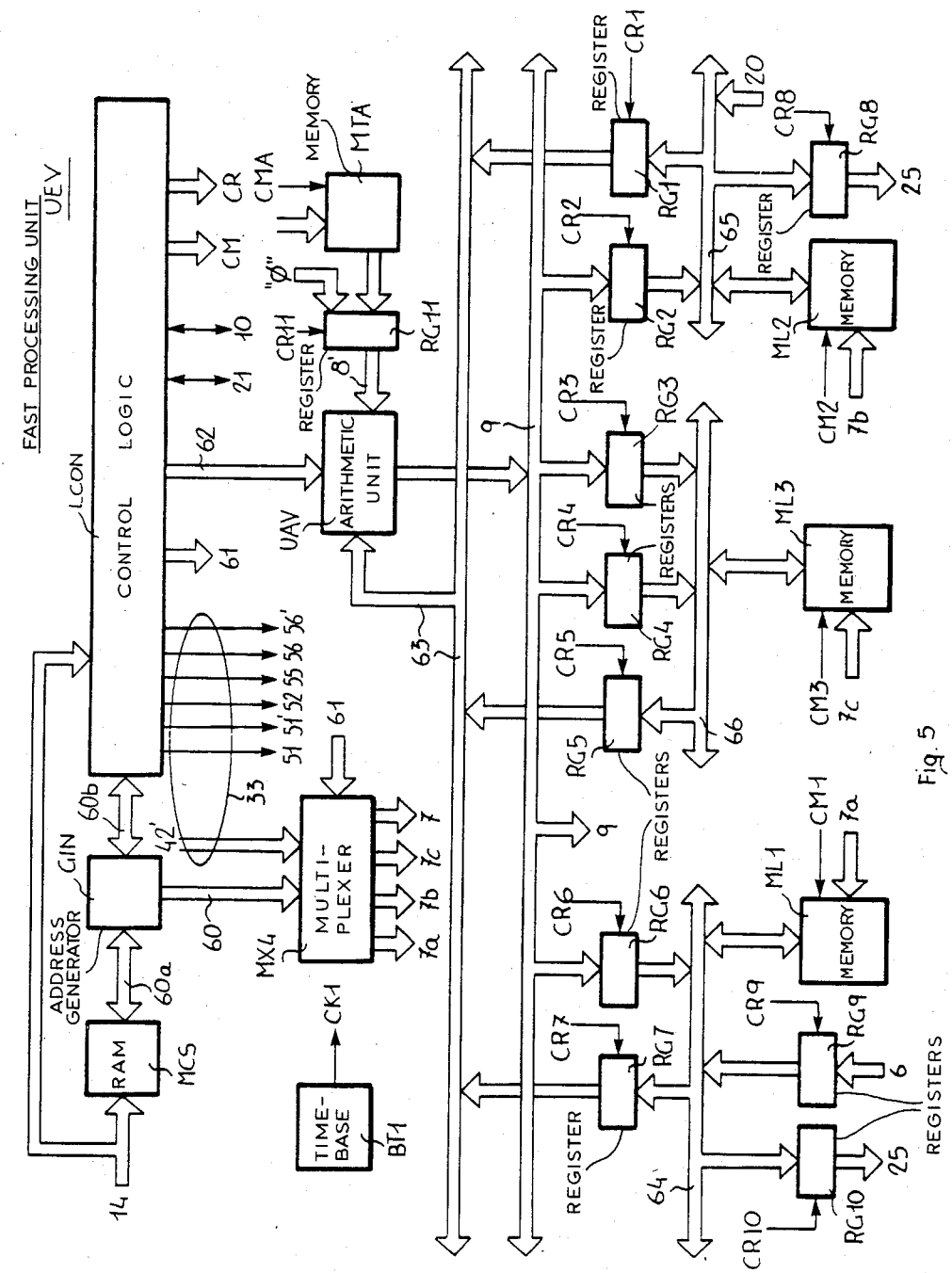
FIG. 5 is the diagram of block UEV of FIG. 1.

FIG. 5 shows the block diagram of fast processing unit UEV. MCS is a random access memory where, during initialization, microprocessor MP (FIG. 1) writes via bus 14 the map of transform significant coefficients, i.e. those which are assigned some bits. GIN is a block which generates addresses for memories MTA, ML1, ML2, ML3.

GIN comprises three 4-bit counters, cascade connected and programmable to the values read in MCS: counter outputs are connected via bus 60 to an input of block MX4, whose second input is connected to bus 42' coming from counter CON1 of FIG. 2.

According to logic level of signals on bus 61, MX4 sends via buses 7a, 7b, 7c, 7, each consisting of 8 wires, suitable bit combinations obtained from the inputs, that is either the bits on bus 42' or two by two combinations of the outputs of counters of block GIN.

GIN generates the addresses sent on bus 60 according to comparisons with the map of significant coefficients present in MCS and sent to GIN via bus 60a, and to enabling signals received from LCON via bus 60b according to comparison results sent by GIN via the same bus 60b.

The comparisons made by GIN with the map of coefficients present in MCS are similar to those made in quantization circuits QUT and QUR and will be further discussed in connection with FIGS. 8 and 9.

LCON is a control logic which emits the control signals for processing unit UEV.

Blocks GIN, MX4 and LCON are not detailed because the description of the operation of unit UEV will be sufficient for their implementation. LCON receives via bus 14 some control signals related to full-duplex or half-duplex operation in reception or transmission and start, stop and reset commands; thus, it carries out interface function with the user.

LCON emits control signals via wires 51, 51', 52, 55, 56 and bus 61, already described; furthermore, it sends: an identification signal of full-duplex or half-duplex operation on wire 56'; control signals for block UAV via bus 62; signals CM1, CM2, CM3, CM4 for memories ML1, ML2, ML3, MTA, via connection CM; signals CR1 ... CR11 for registers RG1 ... RG11, via connection CR.

Via connections 21 and 10, LCON receives the information of "empty buffer" or "full buffer" from BRC and BTR and sends the information of "data acknowledge" to BRC and "data ready" to BTR.

UAV is a fast arithmetic unit which carries out multiplications and internal storage and shift of data present on two input buses 8' and 63 and sends them in double precision to output bus 9. In other words, UAV calculates the matrix products of coefficient or sample blocks, read in memories ML1, ML2, ML3, by transform or antitransform bases read in MTA (FIG. 1), and obtains either intermediate results or transforms or antitransforms of information blocks rewritten in ML1, ML2 or ML3, as will be further discussed.

The arithmetic unit given by way example and not in a limiting sense consists of component TDC 1009J made by TRW. ML1, ML2, ML3 are three random access, work memories of capacity equal to one picture block. They receive the addresses via buses 7a, 7b, 7c from MX4 and enabling and reading/writing signals from LCON via connections CM1, CM2, CM3; furthermore, they are bidirectionally connected to data buses 64, 65, 66.

RG1 ... RG11 are equal registers which, at the reception of the control signal through the respective wire CR1 ... CR11, connect the input bus with the output bus; RG1, RG5, RG7 connect buses 65, 66, 64 with bus 63; RG2 connects bus 9 with bus 65; RG3, RG4 connect bus 9 with bus 66; RG6 connects bus 9 with bus 64; RG8 connects bus 65 with bus 25; RG9 connects bus 6 with bus 64; RG10 connects bus 64 with bus 25; RG11 connects of data output bus 8 of memory MTA with bus 8' connected to one input of UAV.

Furthermore, registers RG1 ... RG11 are used to suitably justify input and output data of UAV. For this purpose, registers RG3 and RG4 take the data only from some wires of bus 9 and register RG11 adds some zeroes on suitable wires of output bus 8'.

MTA is the memory of transform bases already described in connection with FIG. 1, but represented here again for sake of clarity.

BT1 is a typical time-base which supplies clock signal CK1 to the sequential circuits of UEV, the registers and the address generator; the connections conveying CK1 to these circuits have been neglected for sake of simplicity.

Processing unit UEV works asynchronously with respect to video-synchronism and sampling signals present in SYNC (FIG. 2) and then requires a special time-base. As already said, UEV carries out the bidimensional transform of transmission samples and bidimensional antitransform of reception coefficients, using the transform and the antitransform bases stored in MTA.

We know a priori that some of the transformed coefficients of each block are not significant, i.e. they carry a part of information to be neglected for obtaining a given degree of redundancy reduction which can be chosen by the user. Then, transform and antitransform calculation does not consider the terms related to matrix elements of transform bases corresponding to the positions of non significant coefficients, thus reducing the number of operations required.

Figure 6:
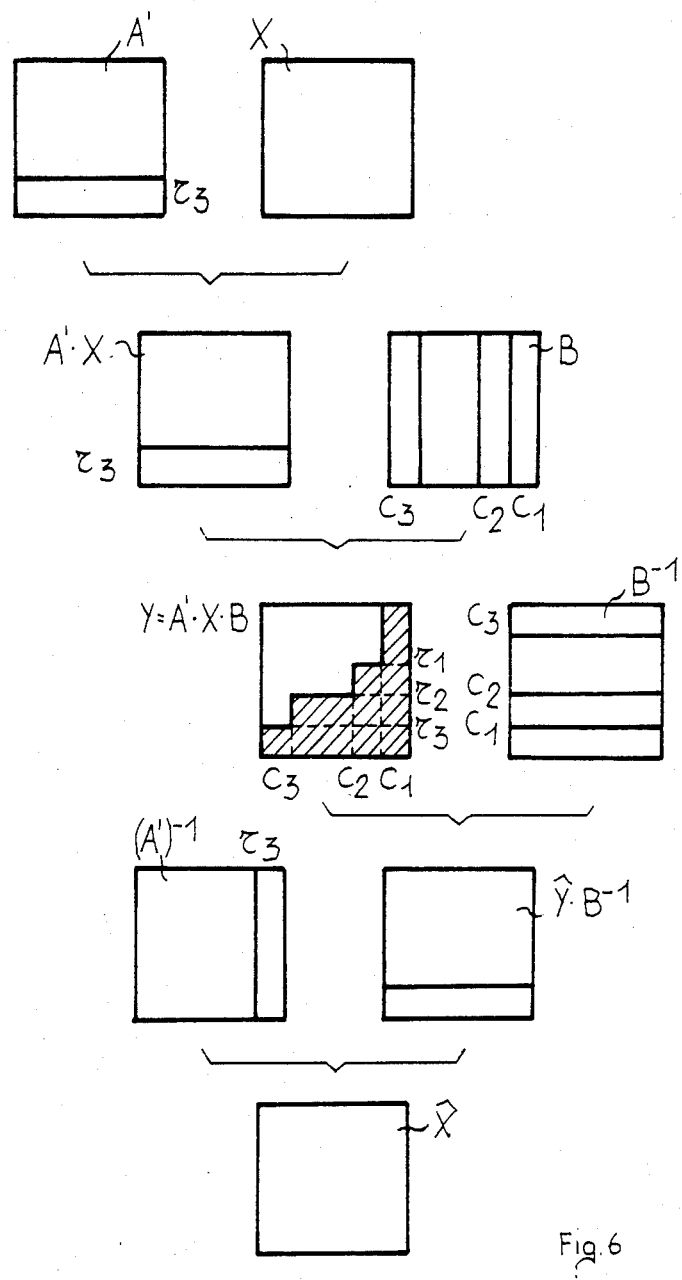
FIG. 6 shows diagrams representing the contents of internal memories of block UEV.

This situation is shown in FIG. 6, where X is a block of picture samples, organized as a matrix of 16×16 samples, which is transferred from MTR to UEV (FIG. 1).

A bidimensional transform is applied to this block X; first, the vertical transform of X is calculated, applying to X the transform basis A (a matrix of 16×16 elements). Matrix product A'·X, with A' transpose of A, is carried out. The rows of A starting from $r_3$ are not considered: therefore matrix A'·X is empty from row $r_3$ on. This intermediate product is then multiplied by matrix B, presenting 16×16 elements and consisting of horizontal transform basis of X, thus obtaining the bidimensional transform $Y - A' \cdot X \cdot B$. This second matrix product calculation does not consider columns of B beyond $c_1$ from the first row of Y up to row $r_1$; from row $r_1$ to $r_2$ of Y, columns of B beyond $c_2$ are not considered; from row $r_2$ to $r_3$ of Y, columns of B beyond $c_3$ are not considered; beyond row $r_3$ of Y, calculations are no more carried out.

Thus, a matrix Y is obtained, where the dashed area corresponds to non significant coefficients and then it is empty.

Matrix Y is then sent by UEV (FIG. 1) to BTR. In reception, buffer BRC sends to UEV matrices Ŷ of transformed coefficients, whose structure is equal to that of Y. Then, in reception, matrices $\hat{Y}$ are bidimensionally antitransformed applying first horizontal antitransform $B^{-1}$ and then vertical antitransform $A^{-1}$, where $A^{-1}$, $B^{-1}$ are matrices with $16\times 16$ elements.

For the calculation of product $\hat{Y}\cdot B^{-1}$, the rows of $B^{-1}$ beyond $C_1$ are not considered up to row $r_1$ of $\hat{Y}$; from row $r_1$ to $r_2$ of $\hat{Y}$, rows of $B^{-1}$ beyond $C_2$ are not considered; from row $r_2$ to $r_3$ of $\hat{Y}$, rows of $B^{-1}$ beyond $c_3$ are not considered; beyond row $r_3$ of $\hat{Y}$ calculations are not carried out. Thus, intermediate product matrix $\hat{Y}\cdot B^{-1}$ is obtained, where the area beyond row $r_3$ is empty. For the calculation of product $\hat{X}=(A')^{-1}\cdot \hat{Y}\cdot B^{-1}$, columns of $(A')^{-1}$ beyond $r_3$ and rows of $\hat{Y}\cdot B^{-1}$ beyond $r_3$ are not considered. The result is full matrix $\hat{X}$ which contains the reconstructed samples of a received image block, then written by UEV (FIG. 1) in MTR.

It is clear that the number of thresholds $r_1$, $r_2$, $r_3$, $C_1$, $c_2$, $c_3$ is given by way of example and not in a limiting sense, because the subdivision of matrices of FIG. 6 into thresholds depends on the redundancy reduction degree chosen by the user.

Figure 7:
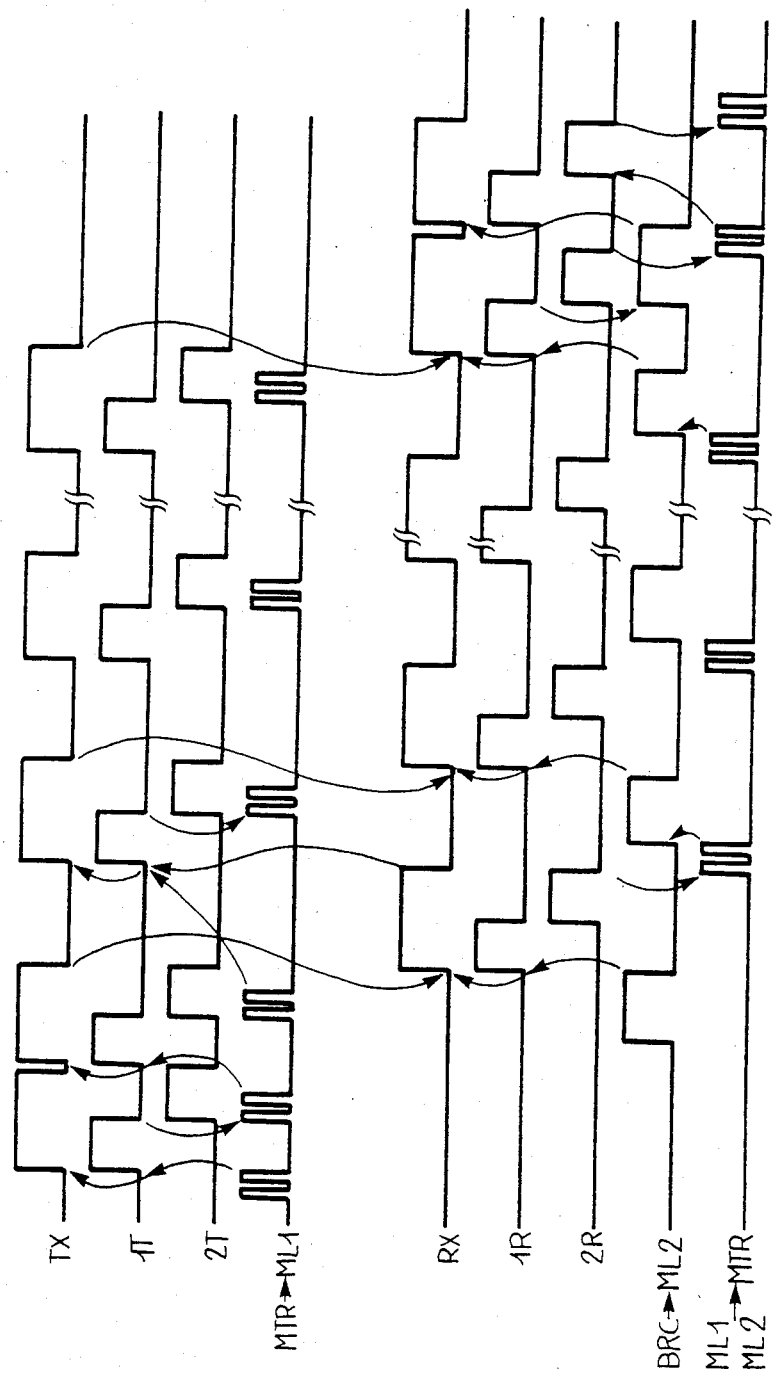
FIG. 7 shows time diagrams related to the sequence of operations carried out by block UEV.

Now we describe the operation of processing unit UEV of FIG. 5, taking into account that it calculates the matrix products of FIG. 6, and making also reference to FIG. 7.

At the initialisation, microprocessor MP (FIG. 1) sends via bus 14 to logic LCON the control signals related to the operation type: in the case of full-duplex, UEV alternates transmission and reception; in the case of half-duplex, it works only in transmission or in reception.

Furthermore, MP loads in MCS (FIG. 5), for each line of the matrix of significant coefficients, the value of column thresholds ($C_1$, $C_2$ or $C_3$ of FIG. 6) and the value of last useful line $r_3$.

Counters of block GIN have to stop at these threshold values during the addressing procedures of work memories and transform bases.

FIG. 6 shows that the following addressing modes should be implemented:
  scanning of the same line for 16 consecutive times;
  sequential scanning for 16 consecutive times of the whole memory;
  transposed addressing mode for each previous mode, obtained exchanging line addresses with column addresses;
  sequential scanning only one time of the whole memory.

In fact, for example, for the calculation of the matrix product $A'\cdot X$, each row of $A'$ is scanned 16 consecutive times, while X is scanned 16 times in a sequential transposed manner, and $A'\cdot X$ is sequentially scanned 1 time during writing.

Memory MTA contains transform bases A and B, while antitransform bases $A^{-1}$, $B^{-1}$ are not specifically contained in MTA because, being said bases orthogonal (in the orthogonal matrices, the inverse matrix is equal to the transposed matrix through a constant factor of proportionality), they are obtained from A and B through a simple exchange of row and column addresses, and a suitable shift of UAV inputs and outputs for constant factor recovery and keeping the same precision degree of calculations.

Memory ML1 contains a block X of samples in transmission coming from video memory MTR (FIG. 1).

Memory ML2 contains a block $\hat{Y}$ of transformed coefficients in reception, coming from buffer BRC (FIG. 1).

Memory ML3 contains intermediate products of both transform $A'\cdot X$ (FIG. 6) and antitransform $\hat{Y}\cdot B^{-1}$. Let us suppose a full-duplex operation.

As already said, unit UEV has an asynchronous operation; i.e. the end of each phase determines the beginning of next phase. This is shown in FIG. 7 by curve lines ending with an arrow related to phase sequence.

Each phase activation is shown in FIG. 7 by the high livel of the related curve. Each phase of transmission TX and reception RX consists of two sub-phases 1T,2T and 1R,2R.

For transfers from MTR to ML1 and from ML2 to MTR, addressing of memories ML1 and ML2 is controlled by SYNC (FIG. 2) which supplies the addresses via bus 42' chosen by block MX4 (FIG. 5). Conversely, during transform and antitransform calculation procedures, the addresses of memories ML1, ML2, ML3 are supplied by block GIN.

The first phase after initialization foresees the transfer of a block of samples X from video memory MTR (FIG. 1) to memory ML1; each transfer consists of two successive phases, one for each sample semiblock, as explained in connection with FIG. 1.

Then, the first transmission phase is carried out: during subphase 1T, GIN addresses memories ML1 and MTA, and UAV calculates the matrix product $A'\cdot X$ (FIG. 6) written in ML3 via RG3; in subphase 2T, GIN addresses ML3 and MTA, and UAV calculates the final product Y (FIG. 6) which is directly sent via bus 9 to transmission buffer BTR (FIG. 1).

As processing, quantization and first block transmission by the terminal of opposite end of line LT (FIG. 1) give rise to a delay higher than the duration of the first operation TX, two consecutive operations TX are carried out at the beginning, to avoid useless waiting times. Then, in this initial phase, operation is similar to that of half-duplex in transmission.

As at the end of first subphase 1T, ML1 contents are no more useful, the transfer of the second picture block from MTR to ML1 begins immediately. While full-duplex, in steady-state conditions, requires this operation be carried out during phase RX, half-duplex and preliminary phase require ML1 filling during subphase 2T, to speed up at most arithmetic operations; this choice is useful also for steady-state and full-duplex conditions.

Simultaneously to TX phases, a block $\hat{Y}$ of transformed coefficients is transferred from reception buffer BRC (FIG. 1) to memory ML2 (FIG. 5) via bus 20.

At the end of second phase TX, the transfer from BRC to ML2 is completed and the first phase of reception RX i.e. the actual full-duplex operation, can begin.

In subphase IR, GIN addresses memories ML2 and MTA, and UAV calculates the matrix product $\hat{Y}\cdot B^{-1}$ (FIG. 6) written in ML3 via RG4; in next subphase 2R, GIN addresses ML3 and MTA and UAV calcualtes the product $(A')^{-1}\cdot \hat{Y}\cdot B^{-1}$ written in ML2 via register RG2.

At the end of this transfer, next transmission phase TX can begin simultaneously to transfer of ML2 contents to video memory MTR via register RGP and bus 25.

Always simultaneously to phase TX, next transmission block is transferred from MTR to ML1 and next reception block from BRC to ML2.

Now, all operations are cyclical until microprocessor MP (FIG. 1) emits a command of full-duplex operation end: the related control signal, supplied via bus 14, is asynchronous, then before stopping, the device has to end the operations related to last field up to the processing of the last received block.

At the end of last phase TX, the operations become similar to half-duplex reception, as the last two reception phases RX follow one another, where the last two blocks still present in the buffers of blocks CLT, QUR, BRC (FIG. 1) are reconstructed.

The difference between the last two RX phases and previous RX phases consists in writing the reconstructed block $\hat{X}$ of subphase 2R in ML1 instead of ML2; in order to speed up arithmetic operations ML1 would be otherwise unused. Thus, transfer of block $\hat{Y}$ from BRC to ML2 can be simultaneous to phase 2R and to transfer of the reconstructed block $\hat{X}$ from ML1 to MTR via register RG10 and bus 25.

This use of memories ML1 and ML2 is well exploited during half-duplex operation in reception.

When the last received block has been written in video memory, all arithmetic operations end, while the received field is visualized, and if also the last quantized coefficient has been transmitted, the device waits for new commands.

Figure 8:
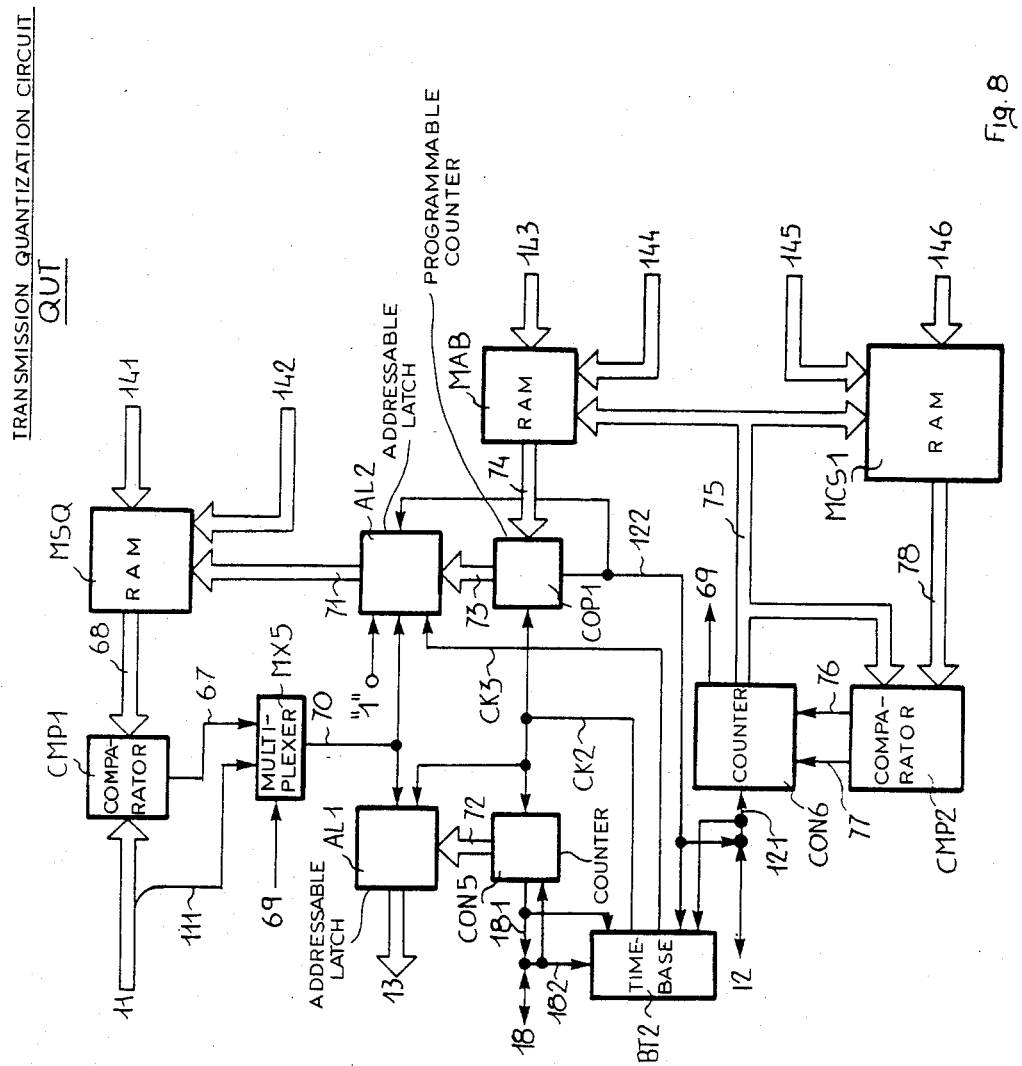
FIGS. 8 and 9 show the diagrams of blocks QUT and QUR of FIG. 1.

FIG. 8 shows the circuit scheme of transmission quantization circuit QUT of FIG. 1.

MSQ is a random access memory which contains the values of quantization thresholds. Let us underline that the number of bits used to quantize the coefficients varies as a function of coefficient index of a block to be quantized. Each number n of quantization bits is associated with a given n-th quantization law divided into $2^n$ intervals and presenting $2^n$ thresholds (the lowest level threshold is not considered).

MAB is a random access memory which contains the assignment table of bits to coefficients, i.e. the number of quantization bits to be assigned to each coefficient as a function of coefficient index. Generally, an increase in coefficient index implies a decrease in the number of quantization bits, because, considering the bidimensional transform carried out before, the low index coefficients have a higher associated energy and then a finer subdivision in the quantization process holds.

MCS1 is a random access memory, which contains the table of significant coefficients, i.e. the same information contained in memory MCS of processing unit UEV (FIG. 5).

During initialization procedures, memories MSQ, MAB, MCS1 are addressed and written by microprocessor MP (FIG. 1): addresses are received via bus 142 for MSQ; via bus 144 for MAB; via bus 145 for MCS1; data are received by MSQ via bus 141, by MAB via bus 143, by MCS1 via bus 146.

Buses 141, . . . , 146 are a part of bus 14 (FIG. 1) coming from interface INT.

CMP1 is a typical comparator which emits via wire 67 a signal of logic level "1", when the binary number of bus 11, i.e. the value of transformed coefficient coming from BTR (FIG. 1), is higher than or equal to the binary number of bus 68, i.e. the threshold value of a given quantization law, read in MSQ. Otherwise, CMP1 emits logic level "0" via wire 67.

Wire 67 is connected with an input of multiplexer MX5, whose second input is connected with wire 111 which carries the bit of the most significant position of bus 11.

MX5 connects with output wire 70 one of the two inputs according to logic level of control signal coming from block CON6 via wire 69.

AL1, AL2 are two addressable latches which compose a given bit configuration on output buses 13 and 71. Composition takes place by writing of bits present at consecutive instaqnts on input wire 70, in the registers of output positions addressed by the bit configurations present on buses 72 and 73. The bit configurations so obtained are: on bus 71, consisting of 13 wires, the addresses for memory MSQ; on bus 13, consisting of 16 wires and being output bus of QUT towards CLT (FIG. 1), quantized values of transformed coefficients.

Furthermore, AL2 can write, in output positions addressed by COP1, at suitable instants, the logic value "1" wired at an input, as explained in the following, and resets all output registers when it receives signal 122.

CON5 is a typical 4-bit counter which emits an ordered succession of binary numbers on 4-bit output bus 72; then, bits present on wire 70 are written in AL1, in cyclical successive positions of bus 13. When CON5 reaches the highest counting number, it emits the "data ready" signal on wire 181, being one of the wires of connection 18 to CLT (FIG. 1); CLT at the same time collects all bits present at outputs of AL1 on bus 13; at the end of the collection, t emits via connection 18 on wire 182 a "data acknowledge" signal.

COP1 is a typical programmable 4-bit counter which emits ordered decreasing successions of binary numbers, starting from the highest values sent via bus 74 by memory MAB. At the end of each counting, COP1 emits on wire 122 a signal of end of counting, which constitutes both the "data acknowledge" information, i.e. the request of new data for transmission buffer BTR (FIG. 1), sent to it via connection 12, and the reset signal for output registers of AL2 and the temporary stop signal for time base BT2.

CON6 contains two typical 4-bit counters, similar to CON5. These two counters compose on 8-bit bus 75 the row and column addresses for memory MAB.

CON6 receives via wire 121 (pertaining to connection 12) from BTR (FIG. 1) "data acknowledge" information, being also the clock signal for counting increase of internal counters.

When CON6 receives via wire 76 a signal of "end of column" it resets the counter of column addresses and increases by a unit the row address counter. When it receives via wire 77 a signal of "end of row", it resets both counters and this condition represents the beginning of a new block; then, CON6 emits a pulse, via wire 69, which switches MX5 to input 111 for the time necessary to assign the most significant bit of the first coefficient.

Then, addresses emitted on bus 75 concern only the significant coefficients, in accordance with explainations of resulting matrix Y of FIG. 6.

Bus 75 is also connected with an input of equality comparator CMP2, whose second input connects data output bus 78 of memory MCS1.

Addresses of memory MCS1 are carried by wires of bus 75 corresponding to row counter.

The counting value reached by row counter of CON6 allows the reading in memory MCS1 of the threshold values for MAB column and row addressing. These threshold values are continuously compared in CMP2 with the present counting values reached by CON6. Referring also to matrix Y of FIG. 6, the row address selects in MCS1 the threshold column $c_1$, up to row $r_1$; the threshold column $c_2$, from row $r_1$ to $r_2$; the threshold column $C_3$, from row $r_2$ to $r_3$. When the column Counter reaches the threshold value ($c_1$ or $c_2$ or $c_3$), CON6 emits the signal on wire 76; conversely, when the row counter reaches the threshold value $r_3$, CON6 emits the signal on wire 77.

The comparison made by $CMP_2$ with MCS1 thresholds are similar to these made by blocks GIN and MCS of FIG. 5.

Block BT2 consists of a typical time base which sends clock signal CK2 to blocks AL1, CON5, COP1, and clock signal CK3, of a frequency twice that of CK2, to block AL2. QUT has an asynchronous operation with respect to other circuits, then a specific time base is required.

BT2 can be temporarily stopped by either signal on wire 181, until "data acknowledge" signal is received via wire 182 from line coder CLT (FIG. 1), or signal on wire 122, until "data ready" signal is received via wire 121 from BTR (FIG. 1).

Let us now describe the operation of block QUT of FIG. 8.

As already said, during initialization procedure, microprocessor MP (FIG. 1) writes pertinent data in memories MSQ, MAB and MCS1. In MSQ, different quantization parameters are written so as the thresholds of the n-th quantization law occupy positions with addresses from $2^n$ to $2^{n+1} - 1$, one for each position. When bus 11 presents the first coefficient of a block, CON6 counters are reset to zero: value zero addresses the position of memory MAB where the number of bits used to quantize the first coefficient (zero - index coefficient) is written; as previously said, the number of bits is already incremented by one unit. This number is used to program counter COP1 which emits on bus 73 the binary number coding.

The binary number on bus 73 addresses the corresponding position of output register of AL2 (e.g., if the quantization bit number is 12, bus 73 will present binary number 1101; this number will address output register of AL2 corresponding to the 13-th wire of bus 71).

Number "1" wired is written in this register.

Then, COP1 decrements by one unit the counting and addresses the less significant adjacent position on bus 71 (in the example, the 12-th position) and writes the number "1" wired, while all other positions present value "0". Thus, the central threshold of the relevant quantizer is addressed (in the example, the 12-bit quantizer has $2^{12} = 4,096$ thresholds and occupies in MSQ the positions from $2^{12}$ to $2^{13} - 1$; then the memory position $2^{12} + 2^{11}$, corresponding to threshold 2,048 is addressed).

The value of the addressed threshold is sent to bus 68 and compared in CMP1 with the coefficient value on bus 11.

At this instant, multiplexer MX5 is switched to wire 111; thus, the first result of the comparison carried out by CMP1 is neglected and wire 70 receives directly the bit of the most significant position of the coefficient (motivation is explained later). The bit on wire 70 is written in AL2 in the place of the second "1" wired written previously (in the example, in the 12-th position): in fact, having signal CK3 a frequency twice that of CK2, two writing operations take place in the position of AL2 addressed, for each change of address on bus 73.

Furthermore, the bit on wire 70 is written in AL1 in the output register addressed by CON5.

Then, CON5 counts forwards and COP1 backwards, so as COP1 addresses the less significant adjacent position of bus 71 (in the example, the 11-th position) where "1" wired is written.

This new bit configuration on wire 71 (in the example: logic "1" in the 13-th position, bit of wire 70 in the 12-th position, logic "1" in the 11-th position, zeroes in the other positions) addresses the central threshold of the 12-bit quantization-law half selected by the value of bit on wire 70.

Now, signal 69 has already changed logic level, thus the new result of the comparison made by CMP 1 between the coefficient and the new threshold value is really sent via wire 70 and written in AL1 in the new adjacent position addressed by CON5, and in AL2 in the position where the last "1" wired has been written (in the example in the 11-th position).

When COP1 ends the counting, CMP1 will have carried out n comparison (in the example n=12): the n bits resulting from these comparisons represent the coefficient quantized value and are written in n consecutive positions of AL1 outputs.

At the end of the counting, COP1 emits also the signal on wire 122: AL2 output registers are reset and, when BTR (FIG. 1) emits the signal on wire 121, CON6 increases the counting and determines the reading in MAB of the bit number used to quantize the second coefficient of the block: this number is written in COP1 and then a new quantization process begins, as previously described.

Conversely to previous case, multiplexer MX5 is always switched on input 67. This happens because the first coefficient of a block is always positive and the most significant bit of bus 11 is the most significant bit of coefficient value and can be immediately considered as the results of the first comparison made by CMP1 still before this comparison is carried out; all other coefficients can take positive or negative values, ranging only on 11 bits, because the 12-th bit, the most significant bit, is the two complement sign bit, which cannot be handled in the same way as the corresponding bit of the first coefficient.

At the end of the quantization process of block coefficients, CON6 receives signal 77 and resets internal counters; then, the quantization of the first coefficient of the next block begins, as already described.

Coefficients are quantized with variable-length (depending on their index), while they are sent to a fixed-length output buffer, i.e. AL1; then, it may happen (or rather it happens with high probability) that coding bits of a coefficient are divided between two successive readings.

Figure 9:
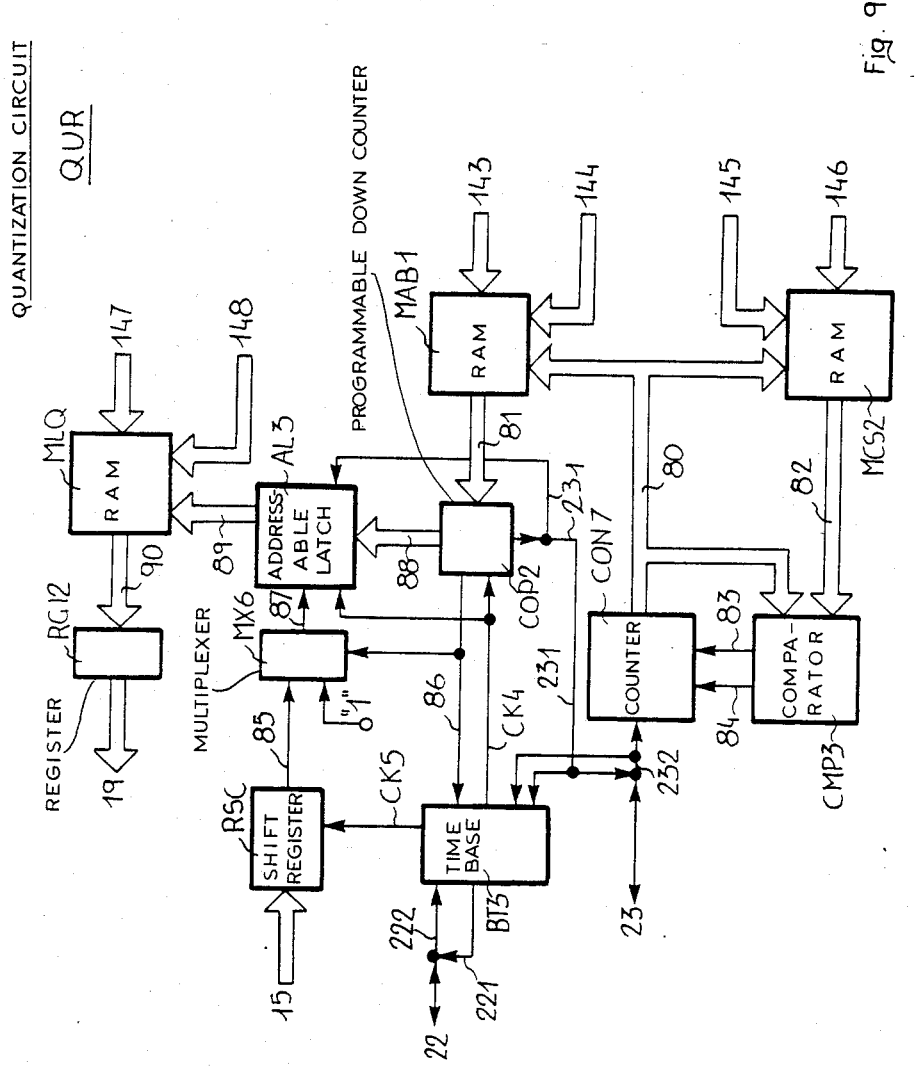

FIG. 9 shows the block diagram of the receiving quantization circuit QUR of FIG. 1. MLQ shows a random access memory which contains the different values of quantization levels, i.e. the values of the central points of quantization intervals, in one to one correspondence with the contents of memory MSQ of FIG. 8.

MAB1 is a random access memory which contains the same information of MAB of FIG. 8, i.e. the assignment table of bits to coefficients.

MSC2 is a random access memory which contains the same information of MCS (FIG. 5) and MCS1 (FIG. 8), i.e. the table of significant coefficients.

During initialization procedures, microprocessor MP (FIG. 1) writes the data in MLQ via bus 147 at the addresses sent via bus 148; furthermore, it writes the data in MAB1 and MCS2 using the same buses of memories MAB and MCS1 of FIG. 8. CON7, CMP3 are circuit blocks similar to blocks CON6 and CMP2 of FIG. 8.

The operation of blocks CON7, CMP3, MAB1, MCS2 is similar to that of the corresponding blocks of the transmitting quantization circuit of FIG. 8, which reference is made to: in FIG. 9, buses 80, 81 and 82 have the same function of the respective buses 75, 74 and 78 of FIG. 8 and wires 83, 84 and 232 have the same function of respective wires 76, 77 and 121 of FIG. 8.

In FIG. 9, RSC is a typical shift register which serially emits on output wire 85 the bits received in parallel at the inputs on bus 15; the bits come from multiplexer MX1 of FIG. 1 and are relevant to the quantized coefficients of picture blocks.

Also block QUR has an asynchronous operation and then requires a particular time base BTR (FIG. 9), which sends clock signal CK4 to blocks AL3 and COP2 and clock signal CK5 to block RSC. Signal CK5 is equal to signal CK4, but it is inhibited in the time intervals where the signal is present on wire 86.

After RSC has sent via output wire 85 all bits picked up at a certain instant from bus 15, time base BT3 emits on wire 221 the "data acknowledge" signal, which is sent via connection 22 to line coder CLT of FIG. 1, which sends the "data ready" signal on wire 222 to BT3, when other data to be sent are ready.

Time base BT3 stops in the time elapsing between the emission of "data acknowledge" signal on wire 221 and the receptin of "data ready" signal on wire 222.

COP2 is a programmable down counter equal to COP1 of FIG. 8. COP2 counts up to zero starting from the values received from MAB1 via bus 81 and emits on output bus 88 the binary coding of values counted; when value zero is reached, it emits on wire 231 a signal which is also brought to receiving buffer BRC (FIG. 1) as indication of "data ready" via connection 23: BRC answers with "data acknowledge" indication via wire 232. Furthermore, COP2 emits a signal on wire 86 at the beginning of each counting.

Time base BT3 is also stopped in the time elapsing between signal emission on wire 231 and signal reception on wire 232. MX6 is a multiplexer which usually connects output wire 87 with input 85; conversely, whenever COP2 begins counting, it presents at output 87 logic value "1" wired to its other input, according to the logic level of the signal on wire 86 applied to its control input.

AL3 is an addressable latch similar to AL2 of FIG. 8. The bits present on wire 87 are written in AL3 in the ppositions addressed by COP2, in order to compose on bus 89 the reading addresses of memory MLQ.

The contents of output positions are reset in the presence of the signal on wire 231.

Memory MLQ sends via bus 90 the values of quantization levels to register RG12 which on its turn emits them on bus 19 connected with receiving buffer BRC (FIG. 1).

Let us now described the operation of block QUR of FIG. 9. The bits of quantized coefficients reach RSC via bus 15 in 16-bit groups without the additional information related to their subdivision among the various coefficients; this additional information would be useless because it is already supplied by memory MAB1.

In fact, for each coefficient, CON7 addresses memory MAB1 so that the latter programs COP2 to the value given by the number of bits assigned to that coefficient, increased by one unit: at this instant, COP2 emits the signal on wire 86 which allows wired "1" to be writen, via MX6 and wire 87, in the output position of AL3 addressed by COP2, and at the same time it temporarily stops shift register RSC.

Then, COP2 begins counting and controls the writing in output registers of AL3 of the bits sent by RSC via multiplexer MX6 which is now switched on input 85. When COP2 reaches value zero, bus 89 presents, in the least significant positions, the coefficient quantized value, and, in the most significant adjacent position, value "1".

As in the case of QUT of FIG. 8, the coefficient quantized value addresses in MLQ the related quantization level which is also the transformed coefficient value sent to bus 19 via register RG12.

The "1" wired in the most significant position of address for MLQ selects the quantization law to be used for each coefficient, according to the technique adopted for memory MSQ of FIG. 8.

The writing of one more bit at AL3 output with respect to the number of bits of each quantized coefficient requires to stop data shift in RSC for the related time, so as not to loose information when multiplexer MX6 is switched on wired "1".

If quantization bits of a coefficient are divided between two successive readings of register RSC on bus 15, this implies no complications for QUR circuits because, if successive data sent by multiplexer MX1 (FIG. 1) do not arrive immediately, time base BT3 and all quantization circuits are temporarily stopped by signal 222, thus recovering the delay introduced; on the other hand, MLQ addressing takes place when a quantized coefficient has been fully written on bus 89.

Figure 10:
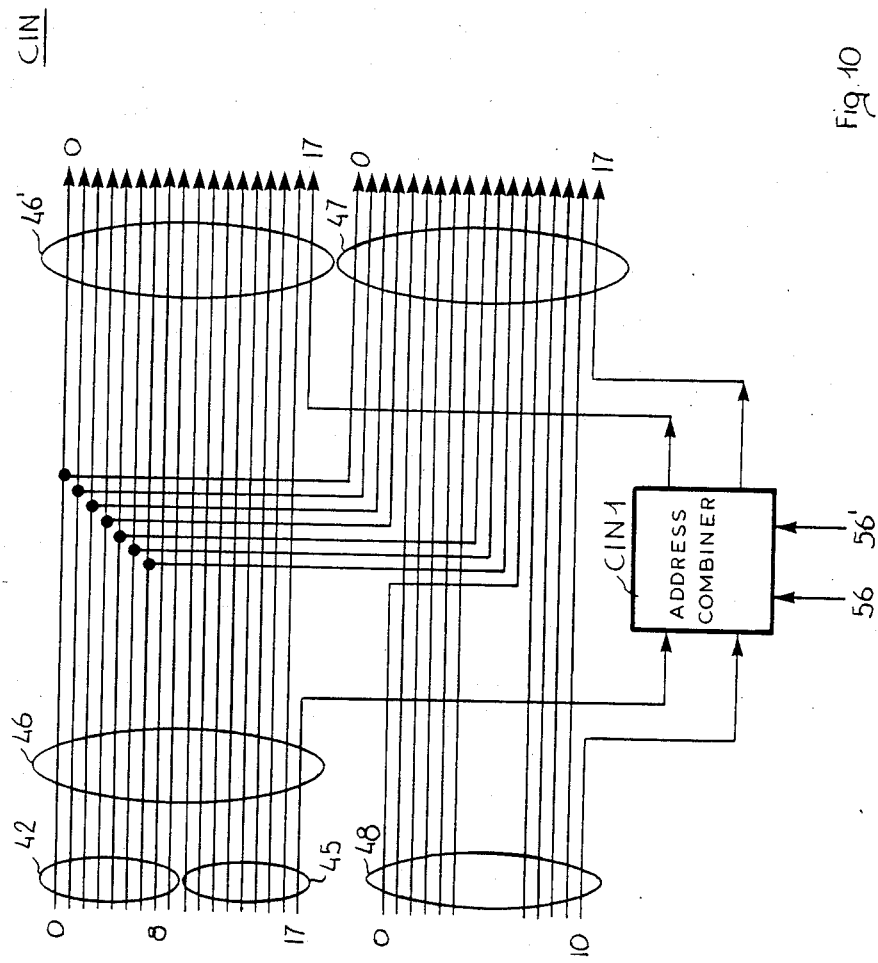
FIG. 10 shows the diagram of block CIN of FIG. 2.

FIG. 10 shows a possible implementation of address combiner CIN of FIG. 2.

Buses 42 and 45 of FIG. 2 constitute bus 46; the wire of the most significant position of bus 46 reaches an input of block CIN1; from an output of CIN1 the wire of the most significant position of bus 46' is taken; the remaining wires of 46' are the corresponding wires of bus 46.

Wires from 0 to 6 of bus 46 constitute also the positions 0 to 3 and 9 to 11 of bus 47, while wire 0 of bus 48 becomes wire 12 of bus 47; wires 1 to 5 and 6 to 9 of bus 48 become wires 4 to 8 and 13 to 16 of bus 47. Wire 10 of bus 48 is connected with an input of block CIN1, while wire 17 of bus 47 is taken from an output of CIN1.

Block CIN1 receives, AT its control inputs, wires 56 and 56' from control logic LCON of processing unit UEV (FIG. 5). Wire 56 sends a pulse at the processing end of a picture frame (half-duplex operation) or field (full-duplex operation); wire 56' supplies a signal for the choice of half or full-duplex operation. Block CIN1 carries out the following logic functions:

if signal 56' is switched on full-duplex, CIN1 outputs present the complementary logic value one with respect to the other and change logic level at each pulse on wire 56;

if signal 56' is switched on half-duplex, output 17 of bus 46' is input 17 of bus 46 and output 17 of bus 47 is input 10 of bus 48.

In the first case (full-duplex), at each field an exchange takes place between the two areas A and B of memory MTR shown in FIGS. 3a and 3b, while the time division of FIG. 4 always holds.

In the second case (half-duplex), the previous case exchange disappears, but whole memory MTR is addressed taking into account only the time division of FIG. 4.

We claim:

1. Coder-decoder of television pictures which can operate in transmission-and reception mode or in transmission-or-reception mode, comprising a digital converter of an analogic picture signal thus obtaining digital samples of a picture signal in transmission and an analogic converter of digital samples of a picture signal in reception, characterized in that it comprises:

a video memory (MTR) containing digital samples of a picture frame and being addressed by an address generator (SYNC), synchronized by a video synchronism signal (32), with two addressing modes, called below sequential and block-by-block addressing modes, and alternatively operating in time intervals corresponding to the visualized and not visualized part of picture signal of each line of analogic picture signal, said sequential addressing being used for writing digital samples coming from said digital converter (ADC) and reading digital samples sent to the analogic converter (DAC), said block-by-block addressing causing a subdivision of each field into equal areas and being used for reading or writing blocks of digital samples coming from or addressed to a fast processing unit (UEV);

said fast processing unit (UEV) carrying out the bidimensional transform of digital sample blocks received from the video memory (MTR) for obtaining blocks of transformed coefficients sent to a transmission buffer (BTR); this unit carrying out also the bidimensionsl antitrasform of blocks of transformed coefficients received from a reception buffer (BRC) for obtaining blocks of digital samples in reception to be sent to the video memory (MTR); said transform and antitransform operations being caried out only in correspondence with significant transformed coefficients, according to a map of significant coefficients depending on the degree of redundancy reduction chosen by the user;

a transmission quantization circuit (QUT) for carrying out dichotomic quantization operations on the transformed coefficients received from the transmission buffer (BTR) for obtaining quantized coefficients at variable length depending on the coefficient index, this circuit using several quantization laws, each consisting of a given number of thresholds of suitable value, and carrying out the quantization of each transformed coefficient using a quantization law chosen as a function of the expected length of each quantized coefficient, said length determining the number of thresholds of the relevant quantization law;

a reception quantization circuit (QUR) for carrying out dichotomic operations on quantized coefficients received at the input for assigning them suitable quantization levels considered as values of the transformed coefficients sent to the reception buffer (BRC), the circuit several quantization laws, each consisting of a given number of suitable levels, these assignments being carried out using a quantization chosen as a function of the quantized coefficient length;

a control unit (MP) which supplies a signal of choice of operation mode, the map of significant coefficients, the map of bit assignment and quantization levels and thresholds.

2. Coder-decoder as defined in claim 1, characterized in that said address generator (SYNC), in transmission-and-reception mode, divides the video memory (MTR) into two halves, each alternatively used in transmission and reception, supplying first to an half a sequential addressing for writing digital samples in transmission pertinent to a picture field received from the digital converter, and then a block-by-block addressing for reading and sending the samples to the fast processing unit (UEV) and substituting said samples with digital samples in reception received from said unit (UEV) and capable of building a new picture field in reception, addressing at the same time and sequentially the other half in order to supply cyclically, to the analogic converter, digital samples pertinent to a present picture field in reception, and determinging, at the end of the substitution, the exchange of the two halves; and characterized in that, in transmission-or-reception mode, said address generator (SYNC) addresses the video memory (MTR) sequentially for either writing or reading the digital samples related to a picture frame received from said digital converter or to be sent to said analogic converter, and block-by-block for reading or writing the difital samples to be sent to or received from the fast processing unit (UEV).

3. Coder-decoder as defined in claim 2, characterized in that said address generator (SYNC) consists of:

a synchronism separator circuit (SEP) which receives said video synchronism signal (32) and emits line (40) and frame (41) synchronism signals;

a phase-locked circuit (COF, VCO, CON1, CON2) synchronized by the line and frame synchronism signals, which generates a sampling frequency signal (3) for the digital converter (ADC), and comprises a first counter (CON1) of successive points of each line, and a second counter (CON2) of the lines of each field, said counters emitting at the respective outputs the binary coding of the countings;

a third (CON3) and a fourth (CON4) counter which count the fields of digital samples in transmission and in reception, contained in each field, by means of pulses supplied by the fast processing unit (UEV), and emit the binary coding of the countings;

a first multiplexer (MX3), which connects the outputs of the third or fourth counter (CON3, CON4) to the output bus (48), according to a control signal (51') generated by the fast processing unit (UEV) and indicating transmission or reception operation;

an address combining circuit (CIN) which receives the outputs of the first (CON1) and second (CON2) counter and of the first multiplexer (MX3), and receives also from the fast processing unit (UEV) a signal (56') indicating transmission-and-reception mode or transmission-or-reception mode, and a signal (56) indicating the end of the operations relating to a picture field or frame, this circuit (CIN) supplying via a first output bus (46') in the least significant positions the outputs of the first counter (CON1), in the most significant positions all outputs of the second counter (CON2) and, in the case of transmission-and-reception mode operation mode, in the most significant position a signal which changes logic level at each pulse of said signal (56) indicating operation end so as to generate the sequential addressing mode, and connecting to a second output bus (47) some wires of output bus (48) of the first multiplexer (MX3) and some of the outputs of the first counter (CON1) and, in the case of transmission and reception mode, supplying in the most significant position of the second output bus (47) the complementary logic value of the signal of the most significant position of the first output bus (46') so as to generate the block-by-block addressing;

a second multiplexer (MX2) which connects the first (46') or second (47) output bus with its output bus (49), according to the logic level of a signal (50) applied to its control input, so as to obtain the alternation between block-by-block and sequential addressing;

a first control logic (LCN) which receives at the inputs the sampling frequency signal (3), the first output bus (46'), and from the fast processing unit (UEV) the signal (56) of end of operations related to a frame or a field and a signal (55) of end of operations related to a block, and which generates, according to a combination of input logic levels, the control signal (50) for the second multiplexer (MX2), and control signals for the video memory (MTR).

4. Coder-decoder as defined in claim 3, characterized in that said fast processing unit (UEV) consists of:

a fast arithmetic unit (UAV) which carries out multiplications and accumulations in order to obtain said bidimensional transform and antitransform;

a memory (MTA) of transform and antitransform bases supplied to an input of the fast arithmetic unit (UAV);

a first work memory (ML1), connected via registers (RG6, RG7, RG9, RG10) with a second input and the output of the fast arithmetic unit (UAV) and with the video memory (MTR) for reading in the latter a block of digital samples in transmission and the successive sending to the fast arithmetic unit (UAV);

a second work memory (ML2), connected via registers (RG1, RG2, RG8) with the second input and the output of the fast arithmetic unit (UAV), the video memory (MTR) and the reception buffer (BRC), for reading in the latter blocks of transformed coefficients in reception and their sending to the fast arithmetic unit (UAV) and for writing blocks of samples in reception coming from the unit (UAV) and their sending to video memory (MTR);

a third work memory (ML3), connected via registers (RG3, RG4, RG5) with the second input and the output of the fast arithmetic unit (UAV) for temporary storage of intermediate results of calculations carried out by the unit (UAV);

a first table memory (MCS) which contains the map of significant coefficients supplied by the control unit (MP), the map consisting of threshold values where addressing procedures of work memories (ML1, ML2, ML3) and memory of bases (MTA) stop;

an address generator (GIN) for work memories (ML1, ML2, ML3) and memory of bases (MTA), consisting of three programmable counters which progressively count up to the threshold values read in the first table memory (MCS);

a third multiplexer (MX4) which receives at its inputs the outputs of programmable counters of the address generator (GIN) and the outputs of the first counter (CON1) and emits the addresses for the work memories (ML1, ML2, ML3) and the memory of bases (MTA), the addresses being either the bits of the first counter (CON1) outputs or the bits of the combination outputs of two of the programmable counters, according to the bit configuration present at control inputs;

a second control logic (LCON) which receives at the inputs from the control unit (MP), the state of the address generator (GIN) and the signals of operation-mode choice emits the control signals for the address generator (GIN), the third multiplexer (MX4), the fast arithmetic unit (UAV), the work memories (ML1, ML2, ML3), the memory of bases (MTA), the register (RG1, ..., RG11), exchanges control signals with said transmission (BTR) and reception (BRC) buffers, and supplies the pulses to the third (CON3) and fourth (CON4) counter, the control signal (51') to the first multiplexer (MX3), the signal of choice of operation mode (56') to the address combiner (CIN), the signal of end of frame or field operations (56) to the address combiner (CIN) and to the first control logic (LCN), to which the signal of end of operations of a block (55) is also sent;

a first time base (BT1) which supplies a clock signal (CK1) to the circuits of the fast processing unit (UEV).

5. Coder-decoder as defined in claim 4, characterized in that said second control logic (LCON) controls the fast processing unit (UEV) so as, in the case of transmission-and-reception mode, under steady-state conditions transmission and reception alternate, determinging in each transmission phase the calculation by the fast arithmetic unit (UAV), in a first sub-phase, of the transform along a dimension of a block of transmission samples read in the first work memory (ML1) using the transformation bases read in the memory of bases (MTA) and writing the result in the third work memory (ML3) and, in a second sub-phase, the calcualtion of the transform along the other dimension of the data read in the third memory (ML3) thus obtaining as a result a block of transformed coefficients in transmission written in the transmission buffer (BTR); determining also during the second sub-phase the loading in the first (ML1) and second (ML2) work memory of the successive sample block in transmission read in the video memory (MTR) and of the successive block of transformed coefficients in reception read in the reception buffer (BRC); determining in each reception phase the calculation by the fast arithmetic unit (UAV), in a first sub-phase, of the antitransform along a dimension of a coefficient block in reception read in the second work memory (ML2) using the antitransform bases read in the memory of bases (MTA), and writing the result in the third work memory (ML3) and, in a second sub-phase, of the antitransform along the other dimension of the data read in the third memory (ML3), thus obtaining as a result a block of digital samples in reception written in the second work memory (ML2) and then transferred to the video memory (MTR); furthermore, determining during an initial transient two consecutive transmission phases and during a final transient two consecutive receptin phases, so as, in the case of only transmission, only the transmission phases are carried out, except for the loading in the second work memory (ML2) of the blocks of transformed coefficients in reception; and so as, in the case of only reception, only the reception phases are carried out, where the results consisting of blocks of digital samples in reception are written in the first work memory (ML1) in the place of digital samples in transmission.

6. Coder-decoder as defined in claim 1, characterized in that said transmission quantization circuit (QUT) consists of:
- a second (MCS1), a third (MAB) and a fourth (MSQ) table memory, written by the control unit (MP), containing: the map of significant coefficients; the table of bit numbers, incremented by one, to be assigned to each coefficient for determinging the variable length, written in positions corresponding to coefficient indices; the quantization thresholds;
- a first comparator (CMP1) which receives from the transmission buffer (BTR) the transformed coefficients and from the fourth table memory (MSQ) the quantization thresholds, and emits a bit whose logic level indicates if a transformed coefficientt is higher than or equal to a threshold corresponding to the central point of the quantization or a part of it;
- a first addressable latch (AL1) which writes the bits received from the output of the first comparator (CMP1) in the register positions determinging by the address configurations supplied to its address input by a fifth counter (CON5) which counts in a progressive and cyclic way up to a value equal to the total number of register positions, the first addressable latch emitting, at the end of each cycle, the bits written in the register positions as values of quantized coefficients in transmission;
- a first programmable counter (COP1) which emits ordered decreasing successions of binary numbers starting from the values supplied by the third table memory (MAB) and supplies a reset signal at the end of each counting;
- a second addressable latch (AL2) which writes the bits received from the output of the first comparator (CMP1), or a wired logic level, in the register positions addressed by the first programmable counter (COP1), these register positions supplying continuously the addresses for the fourth table memory (MSQ) and being written so as, in the positions determined by the value read in the third table memory (MAB), the wired logic level is written, detecting in the fourth table memory (MSQ) a coefficient quantization law, and in the following positions said wired logic level, which determines the threshold of the central point of the quantization low or of a pair of it, and then the output bit of the first comparator (CMP1) which dichotomically detects the half of the quantization law or of a pair of it which includes the value of the transformed coefficient present at the input of the first comparator;
- a sixth counter (CON6), synchronized by the transmission buffer (BTR), which counts the transformed coefficients in transmission and supplies the addresses to the third table memory (MAB), its countings being reset in the presence of signals of end of column (76) or row (77) so that the third table memory (MAB) is addressed according to the map of significant coefficients;
- a second equality comparator (CMP2) which receives the outputs of the sixth counter (CON6) and of the second table memory (MSC1) addressed by the sixth counter and supplies the signals of end of column (76) and row (77) to the sixth counter (CON6);
- a second time base (BT2) which supplies a first clock signal (CK2) to the first addressable latch (AL1), fifth counter (CON5) and first programmable counter (COP1), and a second clock signal (CK3), of frequency twice the first signal, to the second addressable register (AL2).

7. Coder-decoder as defined in claim 1, characterized in that said reception quantization circuit (QUR) consists of:
- a fifth (MCS2), a sixth (MAB1) and a seventh (MLQ) table memory, written by the control unit (MP), containing: the map of significant coefficients; the table of bit numbers, incremented by one, used to quantize each block coefficient, the numbers being written in positions corresponding to coefficient indices; the quantization levels;
- a shift register (RSC) which serially emits on its output (85) the reception quantized coefficients received at the input (15);
- a fourth multiplexer (MX6) which supplies to its output (87) either the output of the shift register (RSC) or a wired logic value ("1"), according to a control signal (86);
- a second programmable counter (COP2) which emits ordered decreasing successions of binary numbers starting from the values supplied by the sixth table memory (MAB1), and supplied a reset signal at the end of each counting and the control signal (86) to the fourth multiplexer (MX6) so as the latter connects with the output (87) the wired logic value in correspondence with each start of counting;
- a third addressable latch (AL3) which writes the bits received from the output of the fourth multiplexer (MX6) in the register positions addressed by the second programmable counter (COP2), these register positions supplying, at the end of each counting of the second programmable counter, the addresses for the seventh table memory (MLQ) and being written so as in the position determined by the value read in the sixth table memory (MAB1) the logic value wired ("1") is written, detecting in the seventh table memory (MLQ) the coefficient quantization law, and in the following positions the bits of the reception quantized coefficient, said bits detecting in the seventh table memory (MLQ) the quantization level which supplies the corresponding value of transformed coefficient in reception sent via a register (RG12) to the reception buffer (BRC);
- a seventh counter (CON7), synchronized by the reception buffer (BRC), whch counts the transformed coefficients in reception, and supplies the addresses to the sixth table memory (MAB), the related countings being reset in the presence of signals of end of column (83) or row (84) so that the sixth table memory (MAB1) is addressed according to the map of significant coefficients;
- a third equality comparator (CMP3) which receives the outputs of the seventh counter (CON7) and of the fifth table memory (MCS2) addressed by the seventh counter, which supplies the signals of end of column (83) and row (84) to the seventh counter (CON7);
- a third time base (BT3) which supplies a third clock signal (CK4) to the second programmable counter (COP2) and to the third addressable latch (AL3), and a fourth clock signal (CK5) to the shift register (RSC); the fourth clock signal consisting of said third clock signal interrupted when the control signal (86) for the fourth multiplexer (MX6) switches the latter to the logic value wired, so as in this interval data shifting is stopped in the shift register (RSC).

8. Coder-decoder as defined in claim 1, characterized in that it further comprises a line coder (CLT) which transmits via low-speed line the quantizd coefficients supplied by the transmission quantization circuit (QUT), and/or receives from the line the quantized coefficients to be sent to the reception quantization circuit (QUR).

9. Coder-decoder as defined in claim 1, characterized in that the quantized coefficients supplied by the transmission quantization circuit (QUT) are directly sent to the reception quantization circuit (QUR).

10. Coder-decoder as defined in claim 1, characterized in that a coded image archieve (DM) is provided, connected with the control unit (MP), which stores the quantized coefficients supplied by the transmission quantization circuit (QUT) and/or where the quantized coefficients to be sent to the reception quantization circuit (QUR) are read.

* * * * *